United States Patent

[11] 3,630,767

[72] Inventors Hans Linstedt
Stuttgart;
Siegfried Bellon, Eltingen, both of Germany
[21] Appl. No. 880,384
[22] Filed Nov. 26, 1969
[45] Patented Dec. 28, 1971
[73] Assignee Robert Bosch, GmbH
Stuttgart, Germany
[32] Priority Nov. 30, 1968
[33] Germany
[31] P 18 11 928.3

[54] PROCESS FOR PROVIDING CONTACTS ON A SEMICONDUCTOR BODY
6 Claims, No Drawings

[52] U.S. Cl. ........................................................ 117/227,
117/213, 117/217, 117/62.1, 117/130 E, 117/212
[51] Int. Cl. ........................................................ B44d 1/18
[50] Field of Search ............................................ 117/227,
62.1, 130 E, 212; 75/82, 170

[56] References Cited
OTHER REFERENCES
Symposium on Electroless Nickel Plating, ASTM Special Tech. Pub. No. 265, pages 18 and 19

*Primary Examiner*—William L. Jarvis
*Attorney*—Michael S. Striker

ABSTRACT: Contacts on a semiconductor body are formed by depositing a nickel coating through reduction of a nickel salt with sodium hypophosphite, followed by treating the semiconductor with a solvent for elemental yellow phosphorus to remove phosphorus from the contact area.

PROCESS FOR PROVIDING CONTACTS ON A SEMICONDUCTOR BODY

BACKGROUND OF THE INVENTION

The invention in general relates to an improvement in a generally known process for forming contacts on semiconductor bodies. In these processes the contacts are formed by depositing nickel through reduction of a nickel salt. The nickel is reduced by means of, for instance, sodium hypophosphite.

In this kind of process, there are usually included in the nickel coating between 5 and 10 percent by weight of phosphorus because a certain amount of phosphorus is deposited together with the nickel.

This inclusion of phosphorus has an undesirable effect on the properties of the semiconductor. For instance, if the nickel deposit is annealed or tempered into a comparatively faintly doped p-coating which forms the base of an NPN planar transistor, the diffusion of the phosphorus in the coating results in a subsequent modification of the conductivity type otherwise appearing in the semiconductor. This effect is particularly pronounced with planar elements which are formed from disks that have been polished by an etching operation and therefore have entirely smooth surfaces.

Difficulties also arise if, prior to the lead treatment of the nickel deposit, an extended temperature treatment of the crystals, for instance at a temperature of 420° C. for a period of 10 minutes, is necessary.

SUMMARY OF THE INVENTION

The object of the present invention is therefore to avoid the inclusion of phosphorus in nickel deposits which are formed on a semiconductor body by reduction of a nickel salt with sodium hypophosphite.

This objective is met by subjecting the semiconductor body or at least the contact areas after application of the nickel coating to treatment with a solvent for elemental yellow phosphorus.

DESCRIPTION OF THE PREFERRED EMBODIMENTS

It is preferred to effect the treatment with the phosphorus solvent at an elevated temperature. Preferably, the temperature is at least 40° C. but is, on the other hand, below 250° C. Above 250° C. there occurs an undesirable phase modification in the phosphorus-containing nickel.

The preferred solvent for leaching out the phosphorus is benzene or a higher benzene derivative in which the semiconductor body should be immersed at boiling temperature. The derivatives should have a boiling point above that of benzene and may, for instance, be toluene, mesitylene, cumene or p-cymene, or other alkyl-substituted benzenes.

Preferably, this step is followed by a rinsing of the semiconductor body, or at least of the contact area, in a solvent for the phosphorus oxides which may have been formed. Examples of such solvents are, for instance, xylene, alcohol, water or ammonia.

The general application of nickel coatings by an electroless process from a nickel bath using sodium hypophosphite as reducing agent is described, for instance, in "Electroless Nickel Plating," ASTM, Special Technical Publication No. 265. Particular attention is directed in this connection to the papers by Abraham Krieg: "Process Procedures" and by G. Gutzeit: "Chemical Reactions."

The following examples will further illustrate the invention.

EXAMPLE 1

A silicon disk was subjected to polishing by an etching operation. The silicon disk formed an n-silicon semiconductor having a specific resistance of 0.001 Ω-cm. at the emitter contact. Nickel was applied to this silicon disk by vapor deposition to form a coating having a thickness between 0.3 and 0.5 μm. The deposition was followed by a tempering step at 750° C. for 15 minutes. The thus-treated disk was then etched with dilute (2 N) nitric acid for a brief moment of time, between about 1 and 3 seconds, and a nickel coating of a thickness between 1 and 1.5 μm. was then applied from an electroless nickel bath using sodium hypophosphite as the reducing agent.

In this process, a nickel coating which contained phosphorus formed on the semiconductor body. The phosphorus was then dissolved out of the coating by the process of the invention. For this purpose the semiconductor body was boiled for 2 hours in benzene.

Instead of benzene, other solvents such as described above, particular o-xylene, could have been used.

In a final step, the phosphorus oxides which might have formed were removed by rinsing in xylene.

Instead of xylene, there could have been used alcohol, water or ammonia in this final step.

EXAMPLE 2

In this example the same process was followed as in example 1. However, the silicon disk was a p-silicon semiconductor body having a specific resistance of 0.2 Ω-cm. at the base contact.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a method for providing contacts on a semiconductor body wherein the contacts are formed by depositing a nickel coating through reduction of a nickel salt with sodium hypophosphite, the improvement comprising the step of treating at least the contact area of the semiconductor body after application of the nickel coating with a solvent for elemental yellow phosphorus at a temperature between 45° C. and 250° C.

2. The process of claim 1, which includes the step of immersing the semiconductor body or at least the contact area thereof subsequent to said solvent treatment in benzene or a benzene derivative having a boiling point above that of benzene.

3. The process of claim 2, wherein the benzene derivative is o-xylene, toluene, mesitylene, cumene or p-cymene.

4. The process of claim 2, which includes the step of rinsing the semiconductor body in a solvent for phosphorus oxides following said immersion in boiling benzene or a benzene derivative.

5. The process of claim 4, wherein the rinsing is effected in xylene, alcohol, water or ammonia.

6. The process of claim 1, which includes the step of rinsing the semiconductor in a solvent for phosphorus following said solution treatment for elemental phosphorus.

* * * * *